United States Patent [19]

Olashaw

[11] 4,288,656

[45] Sep. 8, 1981

[54] BOLTED/WELDED JOINT FOR SWITCHBOARD RUN-IN CONNECTOR

[75] Inventor: William F. Olashaw, Plainville, Conn.

[73] Assignee: General Electric Company, New York, N.Y.

[21] Appl. No.: 150,859

[22] Filed: May 19, 1980

[51] Int. Cl.[3] .......................... H02B 1/20; H02G 5/00; H01R 4/02
[52] U.S. Cl. ............................... 174/71 B; 174/94 R; 361/355; 361/361
[58] Field of Search ................. 174/70 B, 71 B, 94 R; 361/341, 378, 346, 355, 358, 361

[56] References Cited

U.S. PATENT DOCUMENTS

| | | | |
|---|---|---|---|
| 2,453,224 | 11/1948 | Hill | 174/71 B |
| 3,210,716 | 10/1965 | Meacham | 174/70 B |
| 3,855,504 | 12/1974 | Olashaw | 174/71 B |

*Primary Examiner*—Gerald P. Tolin
*Attorney, Agent, or Firm*—Robert A. Cahill; Walter C. Bernkopf; Philip L. Schlamp

[57] ABSTRACT

In an electrical switchboard, an aluminum run-in connector is formed in an L-shaped configuration having a vertically oriented segment and a horizontally oriented segment extending inwardly to a termination where electrical connection to a device terminal can be made. A bolt clamps the vertical segment in electrical connection with an aluminum riser bus and, at the same time, fixtures the connector with a horizontal projection of the vertical segment protruding through an opening in the riser bus. The projection is then welded to the riser bus along the edges of the opening therein to complete a bolted/welded joint between the connector and the riser bus.

4 Claims, 2 Drawing Figures

BOLTED/WELDED JOINT FOR SWITCHBOARD RUN-IN CONNECTOR

BACKGROUND OF THE INVENTION

The present invention relates to electrical joints, and particularly to electrical joints between aluminum riser bus and aluminum run-in connectors in electrical switchboards.

The most reliable electrical joint between rigid aluminum current carrying parts is a welded joint. Unfortunately, welded joints are more difficult to perfect than, for example, bolted joints, particularly in terms of positioning and fixturing the parts prior to welding and accessing the parts interface where the weld is to be made.

It is accordingly an object of the present invention to provide an improved, welded joint for aluminum current carrying parts in an electrical switchboard.

Another object is to provide a welded joint of the above character which also incorporates the features of a bolted joint.

A further object is to provide a combination bolted/welded electrical joint.

Yet another object is to provide a bolted/welded joint wherein the bolt making the bolted joint electrically interconnecting aluminum conductors serves to fixture the conductors while the welded joint is being made.

Other objects of the invention will in part be obvious and in part appear hereinafter.

SUMMARY OF THE INVENTION

In accordance with the present invention there is provided an electrical joint having particular application in electrically joining an aluminum riser bus and an aluminum run-in strap or connector in an electrical switchboard. The joint of the subject invention utilizes an L-shaped run-in connector having a vertically oriented segment and a horizontally oriented segment. A bolt clamps the vertical segment in electrical connection with a riser to perfect a bolted electrical joint therebetween. This bolted joint further serves to fixture the run-in connector with a horizontal projection, preferably integrally formed with the vertical segment of the connector, protruding through an opening in the riser bus. A weld is then created to join the projection to the riser bus along the edges of the opening therein, thereby perfecting a welded joint therebetween. The bolt is left in place to thus achieve a bolted/welded joint conducting current from the riser bus through the run-in connector to a switchboard device whose terminal is electrically connected to the inward termination of the horizontal connector segment.

The invention accordingly comprises the features of construction, combination of elements and arrangement of parts, all of which will be exemplified in the description hereinafter set forth, and the scope of the invention will be indicated in the claims.

For a better understanding of the nature and objects of the invention, reference should be had to the following detailed description taken in conjunction with the accompanying drawings in which.

Corresponding reference numerals refer to like parts throughout the several views of the drawings.

DETAILED DESCRIPTION

Figure 1:
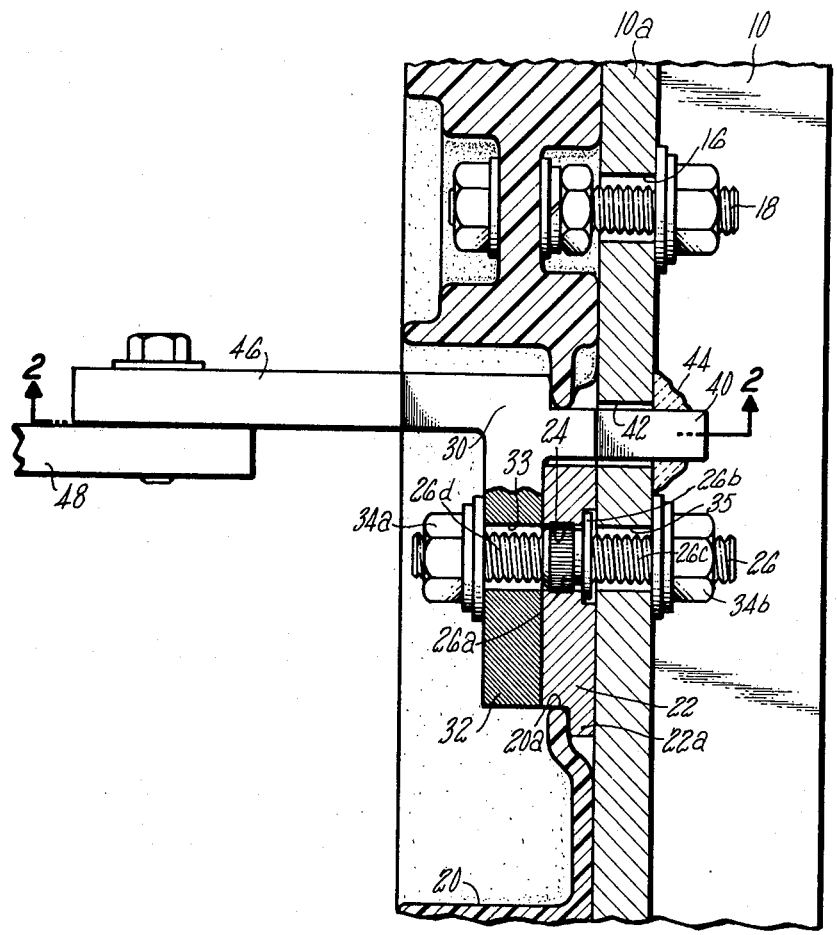
FIG. 1 is a side elevational view, partially in section, of the bolted/welded switchboard joint of the present invention.
Figure 2:
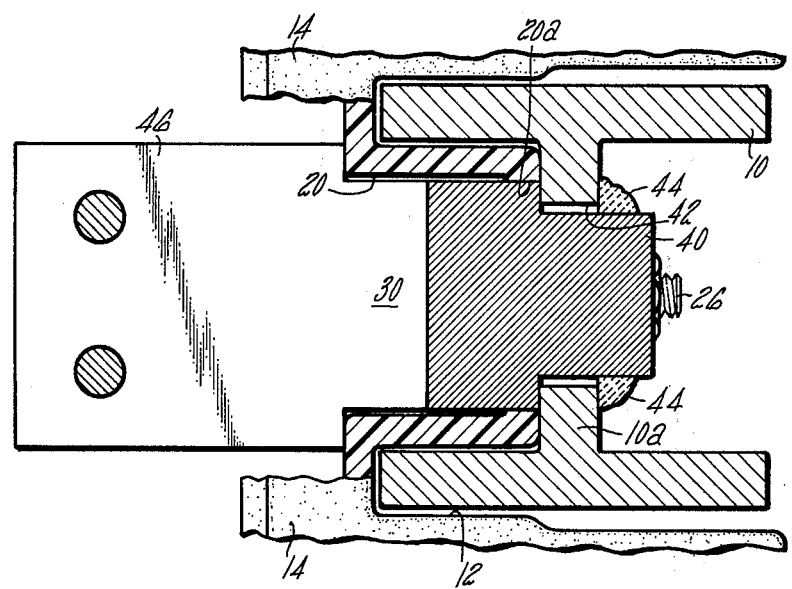
FIG. 2 is a sectional view taken along line 2—2 of FIG. 1.

Referring to the drawings, an aluminum busbar 10, which may be a riser or vertical bus in an electrical switchboard, is illustrated in FIG. 2 as having an H-shaped cross-section. The riser bus is nested in a vertically extending channel 12 formed in the rear or right side of an insulative base, generally indicated at 14 and supported by the switchboard frame (not shown). A series of holes, one seen at 16, are punched in the web 10a of the riser bus to accommodate bolts, one seen at 18, securing the riser bus in place.

The front or left side of the insulative base is formed having well 20, open at its bottom, as indicated at 20a, to expose the riser bus web. Accommodated in the open bottom of well 20 is an aluminum spacer block 22 having a countersunk through-hole 24 formed therein. Pre-assembled to this spacer block is a spline bolt 26 having an enlarged diameter spline portion 26a swaged into hole 24 to the extent permitted by flange 26b, leaving a rearwardly extending, threaded shank 26c and a forwardly extending, threaded shank 26d exposed to each side of the spacer block.

An aluminum run-in connector 30 of generally L-shaped configuration includes a vertically oriented segment 32 in which is provided a bolt hole 33 accommodating the forward extension of threaded shank 26d. A nut 34a is turned tight on threaded shank 26d to clamp run-in connector 30 in electrical connection with spacer block 22. The rearwardly extending threaded shank 26c projects through a hole 35 punched in web 10a of riser bus 10 and receives a nut 34b which is torqued down to clamp run-in connector 30, spacer block 22 and riser bus 10 all in bolted electrical interconnection.

This bolted electrical joint also serves to fixture the run-in connector with a horizontal projection 40, preferably integrally formed with vertical connector segment 32, protruding through an opening 42 punched in the riser bus web 10a. A weld fillet 44 is then laid along the edges of opening 42, using a conventional arc welder, to join the riser bus to projection 40 in welded electrical joint fashion. Nuts 34a and 34b are preferably left in place to thus create a bolted/welded electrical joint between run-in connector 30 and riser bus 10. This joint serves to conduct current form the riser bus through a horizontally oriented, forwardly extending segment 46 of run-in connector 30 to a bolted joint with a conductive member 48, which may be a line terminal strap of an electrical device such as a circuit breaker installed in a switchboard cubicle. Alternatively member 48 may terminate in a male stab on which a female line terminal stab of an electrical device is plugged.

It will be appreciated that the above-described run-in connector bolted/welded electrical joint is repeated for each of the typically three riser buses in a vertical switchboard section, as well as for the plural electrical devices installed therein.

In addition to the exceptional reliable joint achieved, the present invention affords switchboard assembly efficiencies. That is, spacer blocks 22, with spline bolts 26 swaged into through-holes 24, are placed in the open bottoms of wells 20. A run-in connector 30 is then bolted in electrical connection with each spacer block. A lip 22a on each spacer block, together with the run-in connector, serves to positionally capture these subassemblies to insulative base 14. With bolts 18 secured to the insulative base, riser buses 10 are then laid in channels 12 with the threaded shanks of bolts 16, 26 and projections 40 protruding through the pre-formed holes in the riser buses. Nuts are then applied to the threaded bolt shanks to mount the riser buses to the insulative base and to make the bolted joint with the run-in connector/spacer block subassemblies. The projections are then welded to the riser buses, completing the assembly.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. In an electrical switchboard, a bolted/welded electrical joint for electrically connecting an aluminum riser bus with an electrical device installed in a switchboard cubicle; said joint comprising, in combination:
   A. an L-shaped run-in connector fabricated of aluminum having a horizontal segment extending forwardly to a termination facilitating electrical connection with a terminal of the device and a vertical segment;
   B. a rearwardly extending projection formed with said vertical segment;
   C. means forming an opening in the riser bus;
   D. a bolt clamping said vertical segment in electrical connection with the riser bus with said projection protruding through said opening in the riser bus; and
   E. a weld electrically joining said projection to the riser bus along the edge of said opening therein.

2. The bolted/welded joint defined in claim 1, wherein the riser bus is accommodated in a channel formed in the rearward side of an insulative support base and bolted thereto, said run-in connector vertical segment being accommodated in a well formed in the forward side of the base, the well having an open bottom exposing the riser bus.

3. The bolted/welded joint defined in claim 2, which further includes an aluminum spacer block clamped by said bolt in electrical interconnection between the riser bus and said run-in connector vertical segment.

4. The bolted/welded joint defined in claim 3, wherein said bolt includes opposed threaded shanks separated by an enlarged diameter spline portion, said spline portion being swaged into a hole in said spacer block to dispose one of said threaded shanks for projection through a clearance hole in said run-in connector vertical segment and the other of said threaded shanks for projection through a clearance hole in the riser bus, and separate nuts threaded on said shanks to clamp said run-in connector vertical segment, riser bus and spacer block in bolted electrical interconnection.

* * * * *